United States Patent
Jung et al.

(10) Patent No.: US 9,173,094 B2
(45) Date of Patent: Oct. 27, 2015

(54) METHOD AND APPARATUS FOR PERFORMING HANDOVER IN CONSIDERATION OF AUTHENTICATION PROCEDURE

(75) Inventors: Inuk Jung, Gyeonggi-Do (KR); Yongho Kim, Gyeonggi-Do (KR); Kiseon Ryu, Gyeonggi-Do (KR)

(73) Assignee: LG ELECTRONICS INC., Seoul (KR)

( * ) Notice: Subject to any disclaimer, the term of this patent is extended or adjusted under 35 U.S.C. 154(b) by 716 days.

(21) Appl. No.: 13/516,704

(22) PCT Filed: Nov. 11, 2010

(86) PCT No.: PCT/KR2010/007941
§ 371 (c)(1),
(2), (4) Date: Nov. 19, 2012

(87) PCT Pub. No.: WO2011/074785
PCT Pub. Date: Jun. 23, 2011

(65) Prior Publication Data
US 2013/0059565 A1  Mar. 7, 2013

Related U.S. Application Data

(60) Provisional application No. 61/306,554, filed on Feb. 22, 2010, provisional application No. 61/287,672, filed on Dec. 17, 2009.

(30) Foreign Application Priority Data

Apr. 12, 2010  (KR) .......................... 10-2010-0033504

(51) Int. Cl.
*H04W 12/06*  (2009.01)
*H04W 36/00*  (2009.01)
*H04W 36/14*  (2009.01)

(52) U.S. Cl.
CPC .......... *H04W 12/06* (2013.01); *H04W 36/0038* (2013.01); *H04W 36/14* (2013.01)

(58) Field of Classification Search
CPC combination set(s) only.
See application file for complete search history.

(56) References Cited

U.S. PATENT DOCUMENTS

| 8,873,509 | B2 * | 10/2014 | Jung et al. | 370/331 |
| 2006/0166672 | A1 | 7/2006 | Lim et al. | |
| 2008/0305798 | A1 | 12/2008 | Son et al. | |
| 2011/0026475 | A1 * | 2/2011 | Lee et al. | 370/329 |
| 2011/0026495 | A1 * | 2/2011 | Lee et al. | 370/335 |
| 2011/0039593 | A1 * | 2/2011 | Lee et al. | 455/515 |
| 2012/0069759 | A1 * | 3/2012 | Gummadi et al. | 370/252 |

FOREIGN PATENT DOCUMENTS

KR  10-2008-0026855  3/2008

* cited by examiner

*Primary Examiner* — Diane Mizrahi
(74) *Attorney, Agent, or Firm* — Lee, Hong, Degerman, Kang & Waimey (57) ABSTRACT

A method and device for performing handover is provided. A terminal acquires information related to a target base station (BS) through scanning, transmits a ranging request message to the target BS, the ranging request message including authentication information used for a connection with a serving BS and indication information indicating direct handover to the target BS, receives a ranging response message including a handover procedure optimization flag from the target BS and performs a network entry procedure to the target BS according to the handover procedure optimization flag.

14 Claims, 3 Drawing Sheets

METHOD AND APPARATUS FOR PERFORMING HANDOVER IN CONSIDERATION OF AUTHENTICATION PROCEDURE

CROSS-REFERENCE TO RELATED APPLICATIONS

This application is the National Stage filing under 35 U.S.C. 371 of International Application No. PCT/KR2010/007941, filed on Nov. 11, 2010, which claims the benefit of earlier filing date and right of priority to Korean Application No. 10-2010-0033504, filed on Apr. 12, 2010, and also claims the benefit of U.S. Provisional Application Ser. No. 61/306,554, filed on Feb. 22, 2010, and U.S. Provisional Application Ser. No. 61/287,672, filed on Dec. 17, 2009, the contents of which are all incorporated by reference herein in their entirety.

TECHNICAL FIELD

The present invention relates to a method and apparatus for supporting mobility of a terminal in a communication system and, more particularly, to a method and apparatus for performing handover by a terminal between cells in a communication system.

BACKGROUND ART

Handover or handoff refers to a procedure supporting smooth maintaining of communication of a terminal moving between cells during call communication. Handover is classified into three types: soft handover; softer handover; and hard handover. Soft handover refers to handover performed while signals are simultaneously received from several base stations. Softer handover refers to handover performed between different sectors of the same base station, during which signals from the different sectors are simultaneously received. Hard handover refers to handover performed while selectively receiving only one base station signal at a moment.

For example, IEEE 802.16e standard defines four handovers: hard handover (HHO), optimized hard handover (OHHO), fast base station switching (FBSS), and macro diversity handover (MDHO). In this case, however, only the HHO and OHHO are included as mandatory functions in a system profile defined by WiMAX Forum to authenticate mobile WiMAX.

The HHO is a scheme for releasing a connection with a base station on service (i.e., a serving base station) before the terminal establishes a connection to a new base station (i.e., a target base station) like the existing hard handover scheme, which can be understood as a handover scheme of 'break before make', 'break before entry' or 'break before establishment'. The OHHO is a scheme optimizing the HHO, which enhances a service continuity and prevents a call interruption or the like by reducing a handover switching time by optimizing the general HHO. The MDHO is a scheme for establishing a connection to a new base station before the terminal releases the connection with the current base station like the existing soft handover scheme, which can be understood as a handover scheme of 'make before break', 'entry before break' or 'establishment before break'. The FBSS is a handover scheme having a medium performance and complexity of those between the HHO and the MDHO.

Meanwhile, IEEE 802.16m is a standard aiming at satisfying all the advanced requirements for IMT-Advanced system, the next-generation 4G mobile communication standard, while maintaining the compatibility with the IEEE 802.16e system. When the compatibility between the legacy system and the advanced system is to be maintained, mobility of the terminal between both systems is a major technical issue. For example, in, an environment in which an IEEE 802.16e base station (i.e., a legacy base station (BS)) and an IEEE 802.16m base station (i.e., an advanced BS) coexist, handover between the IEEE 802.16e BS and the IEEE 802.16m BS must be smoothly performed. In particular, handover must be smoothly performed when the IEEE 802.16e system is not supported by the IEEE 802.16m BS.

DISCLOSURE OF INVENTION

Solution to Problem

Therefore, an object of the present invention is to provide a method and apparatus for performing handover capable of shortening time required for handover or a service delay time by optimizing a handover procedure between a terminal and a base station in a communication system.

To achieve these and other advantages and in accordance with the purpose of the present invention, as embodied and broadly described herein, there is provided a method for performing handover by a terminal, including: acquiring information regarding a target base station through scanning; transmitting a ranging request message including authentication information used for a connection with a serving base station and indication information indicating direct handover to the target base station to the target base station; receiving a ranging response message including a handover procedure optimization flag from the target base station; and performing a network entry procedure to the target base station according to the handover procedure optimization flag.

In performing the network entry procedure, when the target base station cannot authenticate the terminal based on the authentication information, a full network entry procedure to the target base station may be performed, and when the target base station can authenticate the terminal based on the authentication information, a network re-entry procedure to the target base station may be performed.

The authentication information may be a cipher-based message authentication code (CMAC) tuple.

The handover procedure optimization flag may be set based on whether or not the target base station is capable of authenticating the terminal according to the authentication information, and if the target base station is capable of authenticating the terminal according to the authentication information, the handover procedure optimization flag may be set based on the result obtained by authenticating the terminal by the target base station according to the authentication information.

The handover procedure optimization flag may be set based on the terminal authentication result of the target base station according to the authentication information and security context of the terminal provided by the serving base station to the target base station.

The handover procedure optimization flag may include information identifying a MAC control message that can be omitted in the handover procedure.

In performing the network entry procedure, at least one of an agreement on a key used for authenticating a message transmitted to or received from the target base station or used for ciphering data, a capability negotiation for negotiating a function the terminal wants to support or use and a function the target base station supports or permits, and a registration to a network of the target base station may be performed.

The serving base station may be a base station supporting only IEEE 802.16e system, and the target base station may be a base station supporting only IEEE 802.16m system.

The ranging response message may include a temporary subscriber terminal identifier (TSTID) used before a registration to the network of the target base station.

The handover performing method may include: transmitting a handover request message to the serving base station before selecting the target base station; receiving a handover response message from the serving base station; and transmitting a message instructing handover to the target base station, to the serving base station.

To achieve these and other advantages and in accordance with the purpose of the present invention, as embodied and broadly described herein, there is also provided a method for performing handover by a target base station, including: receiving a ranging request message including authentication information used for a connection between a terminal and a serving base station and indication information indicating direct handover to the target base station from the terminal; determining a handover procedure optimization flag according to the result obtained by authenticating the terminal with the authentication information; transmitting a ranging response message including the handover procedure optimization flag to the terminal; and performing a network entry procedure of the terminal according to the handover procedure optimization flag.

In determining the handover procedure optimization flag, when the terminal cannot be authenticated with the authentication information, the handover procedure optimization flag may be determined to perform a full network entry procedure, and when the terminal can be authenticated with the authentication information, the handover procedure optimization flag may be determined to perform a network re-entry procedure.

The handover procedure optimization flag may be determined based on the result of terminal authentication according to the authentication information and security context of the terminal provided by the serving base station.

To achieve these and other advantages and in accordance with the purpose of the present invention, as embodied and broadly described herein, there is also provided a terminal performing handover, including: a controller acquiring target base station information through scanning and selecting a target base station, and performing a network entry procedure to the target base station according to handover procedure optimization flag; and a transceiver transmitting a ranging request message including authentication information used for a connection with a serving base station and instruction information indicating direct handover to the target base station, to the target base station, and receiving a ranging response message including the handover procedure optimization flag from the target base station.

To achieve these and other advantages and in accordance with the purpose of the present invention, as embodied and broadly described herein, there is also provided a target base station performing handover, including: a controller determining a handover procedure optimization flag according to a result obtained by authenticating a terminal with authentication information, and performing a network entry procedure of the terminal according to the handover procedure optimization flag; and a transceiver receiving a ranging request message including authentication information used for a connection between the terminal and a serving base station and indication information indicating direct handover to the target base station from the terminal, and transmitting a ranging response message including the handover procedure optimization flag to the terminal.

In the handover performing method and apparatus according to exemplary embodiment of the present invention, in performing handover from a legacy base station (e.g., an IEEE 802.16e base station) to an advanced base station (e.g., an IEEE 802.16m base station), a terminal authentication process is optimized to support both a handover procedure of a more effective network re-entry level and a handover procedure of an initial network entry level, and direct handover from a base station supporting only a legacy system to a base station supporting only an advanced system can be effectively performed.

The foregoing and other objects, features, aspects and advantages of the present invention will become more apparent from the following detailed description of the present invention when taken in conjunction with the accompanying drawings.

BRIEF DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings.

MODE FOR THE INVENTION

The exemplary embodiments of the present invention will now be described with reference to the accompanying drawings, in which like numbers refer to like elements throughout. In describing the present invention, if a detailed explanation for a related known function or construction is considered to unnecessarily divert the gist of the present invention, such explanation has been omitted but would be understood by those skilled in the art. The accompanying drawings of the present invention aim to facilitate understanding of the present invention and should not be construed as limited to the accompanying drawings.

Terms required for explaining exemplary embodiments of the present invention will now be described.

Communication System

A communication system according to an exemplary embodiment of the present invention refers to a multi-access system sharing the same radio resources such as a frequency band to provide communication with multiple users. A multi-access scheme applied to the communication system according to an exemplary embodiment of the present invention includes TDMA (time division multiple access), FDMA (frequency division multiple access), CDMA (code division multiple access), OFDMA (orthogonal frequency division multiple access), SC-FDMA (single carrier frequency division multiple access), or any other conventional modulation techniques. Also, multi-access schemes for downlink and uplink transmissions may differ. For example, downlink may use an OFDMA scheme and uplink may use an SC-FDMA scheme.

The communication system according to an exemplary embodiment of the present invention is a system for providing various communication services such as voice data, packet data, and the like, including a base station and a terminal. For example, the communication system according to an exemplary embodiment of the present invention may be an IEEE 802.16e/m system, a mobile WiMAX system, and the like. A communication system hereinafter is not limited to a particular system and an IEEE 802.16m system will be described as an example for the sake of clarification, and in this case, an IEEE 802.16e system is a legacy system of the IEEE 802.16m system.

Terminal

A terminal according to an exemplary embodiment of the present invention may be called by other names such as subscriber station (SS), user equipment (UE), mobile equipment (ME), mobile station (MS), etc., which includes a portable device having a communication function such as a mobile phone, a personal digital assistant (PDA), a smartphone, a notebook computer, and the like, or a non-portable device such as a personal computer (PC), a vehicle-mount device, and the like. Hereinafter, a terminal supporting only the IEEE 802.16e system will be referred to as an 'YMS (legacY MS) and a terminal supporting the IEEE 802.16m system will be referred to as an 'AMS (Advanced MS)'. Here, the AMS may support the IEEE 802.16e system (legacy system) or may not.

Base Station

A base station according to an exemplary embodiment of the present invention refers to a fixed point communicating with a terminal, and may be called by other names such as eNB (evolved-NodeB), NB (NodeB), BS (base station), BTS (Base Transceiver System), access point, and the like. A single base station may provide a communication service with respect to at least one cell, and an interface for transmitting user traffic or control traffic may be used between base stations. Hereinafter, a base station supporting only the IEEE 802.16e system will be referred to as an 'YBS (legacY BS) and a terminal supporting the IEEE 802.16m system will be referred to as an 'ABS (Advanced BS)'. Here, the ABS may support the IEEE 802.16e system (legacy system) or may not.

Context

In general, context refers to a series of attributes defining an environment of entities residing therein. Context may be created for the purpose of providing a particular service such as synchronization, transaction, just-in-time activation, security, and the like. Single context may include several entities. In particular, security context may include information such as an identifier, a group identifier, a privilege, an access authority, a key, and the like, as data with respect to a user or a terminal.

Hereinafter, a handover performing method and apparatus capable of shortening a required time or delay time by optimizing a handover procedure between base stations of a terminal in a communication system according to exemplary embodiments of the present invention will now be described in detail with reference to FIGS. 1 to 5.

An introduction of a next-generation communication system accompanies a huge financial cost, so a common carrier naturally wants to gradually introduce a next-generation communication system while utilizing the legacy communication system to its maximum level. As a result, inter-operability of equipment supporting the legacy communication system and equipment supporting an advanced communication system is a key technical issue. For example, an advanced base station may perfectly support a legacy base station; in this case, however, because of a heavy burden for its cost, an advanced base station supporting only an advanced communication system may be installed according to circumstances.

In a case in which a legacy base station supporting only a legacy communication system and an advanced base station supporting only an advanced communication system coexist and a terminal moves from a cell of the legacy base station to a cell of the advanced base station, a method of processing handover is problematic.

In the following description, it is assumed that an IEEE 802.16e system is the legacy communication system and an IEEE 802.16m system is the advanced communication system. In this case, however, the IEEE 802.16e system and the IEEE 802.16m system are taken as examples to explain an exemplary embodiment of the present invention and the present invention is not limited thereto.

First, a procedure of performing handover by a terminal from the YBS to the ABS will now be described. Methods by which the terminal can perform handover from the YBS to the ABS can be classified into two types: one is handover through Zone Switch, and the other is direct handover (HO). The HO through Zone Switch may be used when the ABS supports the legacy communication system and the direct handover may be used when the ABS does not support the legacy communication system. The handover method through Zone Switch will now be described first hereinafter.

Handover Through Zone Switch

A resource zone of the ABS supporting the legacy system is divided into an LZone (legacy resource zone, IEEE 802.16e resource zone) supporting a legacy system and an MZone (IEEE 802.16m resource zone) supporting the IEEE 802.16m. The YMS operates in the LZone of the ABS and the AMS operates in the MZone of the ABS.

Figure 1:
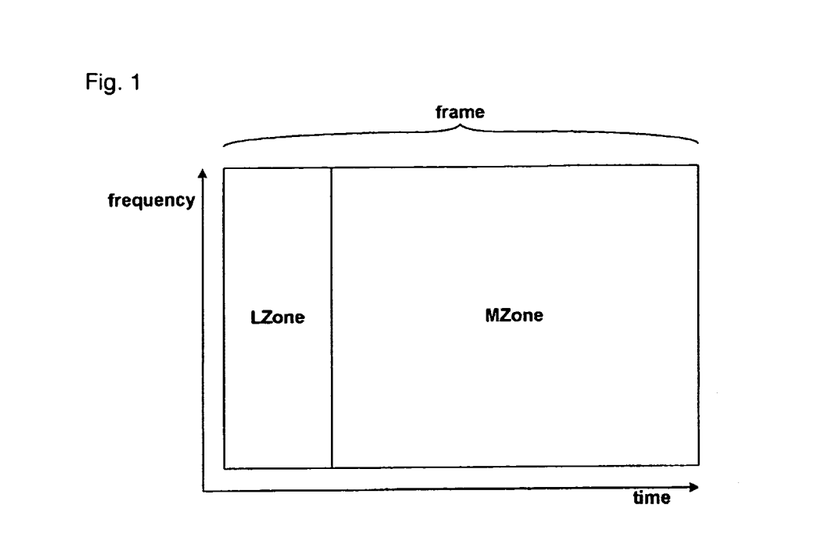
FIG. 1 is a conceptual view for explaining LZone and MZone in an IEEE 802.16m system.

In order for the AMS to perform handover from the IEEE 802.16e network to the IEEE 802.16m network, the AMS must first perform handover to the LZone and then perform zone switching to the MZone of the target ABS. Zone switching is a procedure in which the AMS, which has operated in the LZone, operates in the MZone when the LZone and MZone discriminated by a time division duplexing (TDD) scheme in a single carrier. Namely, zone switching may be understood such that an IEEE 802.16e MAC operation has been performed and the IEEE 802.16m MAC operation is currently performed. Conversely, the case in which the AMS moves from the MZone to LZone can be understood in a similar manner. FIG. 1 is a conceptual view for explaining LZone and MZone in the IEEE 802.16m system.

The AMS and the target ABS must have some pieces of information in advance to perform zone switching. For example, at the AMS' stance, whether or not the target base station is the ABS must be known, and at the ABS' stance, whether or not the terminal is the AMS must be known, in order to perform scheduling to carry out corresponding handover or zone switching procedure. Also, the AMS must know about a zone to which it is going to move. For example, when the AMS moves from the LZone to the MZone, the AMS must receive system information (e.g., a superframe header (SFH)) with respect to the MZone and must know about a start position of the MZone.

The AMS may perform a network re-entry at the LZone of the target ABS, and the target ABS may instruct the AMS to switch the zone to the MZone during the network re-entry to the LZone or to switch the zone to the MZone after the network re-entry to the LZone is completed. Hereinafter, the case in which the AMS switches the zone to the MZone after completing network re-entry to the LZone will be described as an example. The case in which the AMS switches the zone to the MZone during the network re-entry to the LZone is similar and merely different in a time point at which the target ABS transmits an RNG-RSP message including a TLV (Type-Length-Value) to the AMS, so a detailed description thereof will be omitted.

Figure 2:
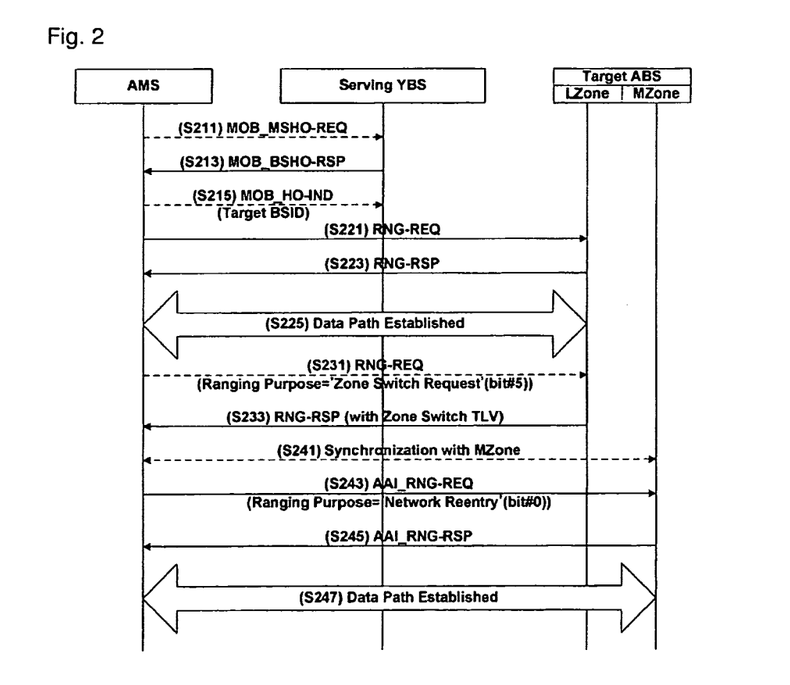
FIG. 2 is a signal flow chart illustrating a handover procedure through zone switching in performing handover from a base station supporting only an IEEE 802.16e system to a base station supporting only an IEEE 802.16m system.

FIG. 2 is a signal flow chart illustrating a handover procedure through zone switching in performing handover from a base station supporting only an IEEE 802.16e system to a base station supporting only an IEEE 802.16m system.

Handover may be initiated by the AMS or the serving YBS. For example, as shown in FIG. 1, when the AMS initiates handover, the AMS transmits a MOB_MSHO-REQ message to the serving YBS (S211), and the serving YBS transmits a MOB_BSHO-RSP message to the AMS (S213). The AMS may transmit a MOB_HO-IND message using a BSID of the target ABS as a parameter to the serving YBS (S215). Next, the AMS transmits an RNG-REQ message to the target ABS (S221) and receives an RNG-RSP message from the target ABS (S223), thus establishing a data transmission path in the LZone of the target ABS (S225).

Zone switching is initiated by the AMS or the target ABS, and a final zone switching is determined by the target ABS. The target ABS may instruct the AMS to switch the zone from the LZone to the MZone during the network re-entry to the LZone or after the network re-entry is completed.

When the AMS initiates zone switching, the AMS transmits an RNG-REQ including a parameter (e.g., a bit #4 of a ranging purpose indication is set to 1) that the AMS designates zone switching to the target ABS (S231), and the target ABS transmits an RNG-RSP including a zone switch TLV to the AMS in response (S233). And the AMS may match synchronization with respect to the MZone of the target ABS (S241). The AMS then transmits an AAI_RNG-REQ including a parameter (e.g., a bit #0 of a ranging purpose indication is set to 1) designating a network re-entry to the target ABS (S243) and the target ABS transmits an AAI_RNG-RSP to the AMS (S245), thus establishing a data transmission path in the MZone of the target ABS (S247).

The handover method through zone switching has been described. A direct handover method will now be described.

Direct Handover

Zone switching can be performed only in the target ABS supporting both the IEEE 802.16e system and the IEEE 802.16m system. Thus, like in a Greenfield mode, a procedure of performing handover from the YBS to the ABS supporting only the IEEE 802.16m system or a procedure of performing handover from the ABS supporting only the IEEE 802.16m to the YBS is separately defined.

The AMS scans to check whether or not there is an ABS nearby through blind scanning and performs handover to the target ABS through an uncontrolled handover (HO) procedure (or an uncoordinated HO procedure) defied in the IEEE 802.16m standard. The blind scanning refers to scanning without being coordinated by the serving base station, which may possibly cause degradation of a quality of service (QoS) such as a lengthened interruption time or the like.

One of the most important tasks of handover is minimizing a delay time possibly generated while the handover procedure is carried out. However, when the AMS directly performs handover, the handover performed toward the target base station is handover without a coordination of a base station, lengthening a delay time. For example, when the AMS serving in the YBS performs handover to the ABS supporting only the IEEE 802.16m system, it is not coordinated by the YBS or the ABS, so the handover is not optimized.

Also, when the AMS performs handover to the ABS supporting only the IEEE 802.16m system, there is no method for requesting it from the YBS. For example, when the AMS initiates handover, a MOB_MSHO-REQ message does not support a message format for handover toward the ABS.

In addition, when the AMS performs network entry to the ABS supporting only the IEEE 802.16m system, the target ABS cannot authenticate the AMS, failing to provide an optimized handover procedure. The reason why the target ABS cannot authenticate the AMS is because a security scheme used for the IEEE 802.16e network and a security scheme (e.g., a security key derivation) used for the IEEE 802.16m network are different, so the ABS supporting only the IEEE 802.16m system is not capable of interpreting or authenticating authentication information the AMS has used in the relationship with the YBS.

As described above, in the direct handover, there is a difficulty in smoothly performing the uncontrolled handover procedure, so the ABS would prefer disconnection (or de-registration) from the serving base station and then performing an initial network entry to the target base station to performing handover. Thus, the procedure of the initial network entry level, rather than an optimized handover procedure, is performed each time on the ABS supporting only the IEEE 802.16m system, causing an ineffective situation that the delay time is lengthened.

Thus, to solve the problem, the present invention proposes a handover performing method capable of minimizing a handover delay time by optimizing the authentication process with respect to the terminal of the target base station by using pieces of authentication information which have been used in the relationship with the serving base station or by adjusting an authentication time point. As described above, the AMS scans an ABS supporting only the IEEE 802.16m system around the AMS through a method such as blind scanning or the like, and when the scanned ABS has a good signal state, the AMS can perform handover by selecting the ABS as a target base station. In this case, the present invention proposes two methods for supporting the direct handover.

The first method is a direct handover method using a CMAC. In detail, when the AMS performs handover from the YBS to the ABS supporting only the IEEE 802.16m system, an extensible authentication protocol (EAP) authentication process is omitted by using cipher-based message authentication code (CMAC) information which has been previously used in the YBS in the network re-entry process, and identification information of the AMS is provided to thereby perform a network re-entry procedure or an initial network re-entry procedure of a normal IEEE 802.16m format.

The second method is a direct handover method without using the CMAC. In detail, when the AMS performs handover from the YBS to the ABS supporting only the IEEE 802.16m system, an authentication procedure is not performed in the network re-entry procedure, and when the network re-entry procedure is finished in a state that the ABS has received the identification information of the AMS, the terminal is finally authenticated in a key agreement procedure, and then a service is provided to the terminal.

In the first method, the terminal is authenticated during the network re-entry procedure, while in the second method, the terminal is authenticated after the network re-entry procedure. Hereinafter, the direct handover method using the CMAC will now be described. In the following description, 'terminal' refers to the AMS, 'serving base station' is a base station currently providing a service to the terminal, as a base station supporting only the IEEE 802.16e system, and 'target base station' is a base station to which the terminal performs handover, as a base station supporting only the IEEE 802.16m system.

Direct Handover Using CMAC

When it is difficult for the terminal to request the IEEE 802.16e network to support handover to the IEEE 802.16m network from the IEEE 802.16e network, the IEEE 802.16m network may support an authentication function of the terminal that performs handover in the IEEE 802.16e network.

In detail, the terminal includes security context information which has been used in the IEEE 802.16e network in an AAI_RNG-REQ message and transmits the same to the target base station. For example, the security context information may be CMAC information (legacy CMAC tuple). Also, the terminal may include information (e.g., a BSID) regarding the previous serving base station, terminal identification information (e.g., CID), terminal identification information (e.g., AMSID*) in the IEEE 802.16m system, and the like, in the AAI_RNG-REQ message and transmit the same.

By transmitting the AAI_RNG-REQ message including a parameter (e.g., a bit #8 of a ranging purpose indication is set to 1) that designates direct handover to the target base station, the terminal informs the target base station that the terminal performs direct handover. In response, the target base station may receive context information of the terminal from the previous serving base station. Here, the context information of the terminal may be static terminal context information such as security context information or dynamic terminal context information.

Meanwhile, the target base station may have a function of interpreting the security information of the IEEE 802.16e system or may not. When the target base station does not have the function of interpreting the security information of the IEEE 802.16e system, the target base station transmits an AAI_RNG-RSP message instructing the terminal to perform the initial network entry procedure to the terminal in response to the AAI_RNG-REQ message which has been transmitted from the terminal. Namely, in this case, the handover procedure of the terminal is not optimized.

When the target base station has the function of interpreting the security information of the IEEE 802.16e system, the target base station authenticates the terminal using the context information of the terminal provided from the serving base station and the security context information (e.g., legacy CMAC tuple) of the terminal which has been transmitted in the AAI_RNG-REQ message of the terminal. And then, the target base station transmits the authentication result to the terminal through an AAI_RNG-RSP message.

In this case, the target base station may transmit the AAI_RNG-RSP message including a parameter (e.g., an HO process optimization) informing about a procedure that can be omitted during a network re-entry or a parameter (e.g., a legacy authentication indicator) informing about whether or not the target base station is capable of authenticating the terminal (namely, whether or not the target base station has the function of interpreting the security information of the IEEE 802.16e system), thus transferring the foregoing information to the terminal.

Table 1 below shows examples of parameters of the AAI_RNG-REQ message used for the direct handover using the CMAC.

TABLE 1

| Name | Value | Usage |
| --- | --- | --- |
| AMSID* | It's the hash value of AMSID in order to protect AMS privacy, which is used for ABS to distinguish AMSs when more than one AMS send AAI_RNG-REQ message at the same time. | It shall be included when the AMS is attempting network entry without its STID/DID which the ABS/Paging Controller assigns. |
| MAC version | Version number of IEEE 802.16 supported by the AMS | |
| Ranging Purpose Indication | The presence of this item in the message indicates the following AMS action: If Bit#0 is set to 1, it indicates that the AMS is currently attempting HO reentry, or, in combination with a Paging Controller ID, indicates that the MS is attempting network reentry from idle mode to the BS. In this case, Bit#1 shall be 0. If Bit#1 is set to 1, it indicates that the AMS is initiating the idle mode location update process, or, in combination with CRID, it indicates that the AMS is initiating DCR mode extension. In this case, Bit#0 shall be 0. If Bit#2 is set to 1, ranging request for emergency call setup. When this bit is set to 1, it indicates AMS action of Emergency Call process. If Bit#4 is set to 1, it indicates that the AMS is attempting to perform location update due to a need to update service flow management encodings for E-MBS flows. If Bit #5 is set to 1, it indicates that the AMS is initiating location update for transmission to DCR mode from idle mode. If Bit #6 is set to 1 in combination with ID of the network entity that assigns/retains the context, it indicates that the AMS is currently attempting reentry from DCR mode. | It shall be included when the AMS is attempting to perform reentry, HO, location update or DCR mode extension. |

TABLE 1-continued

| Name | Value | Usage |
|---|---|---|
| | If Bit#7 is set to 1, it indicates that the AMS is currently attempting network reentry after experiencing a coverage loss. If Bit#8 is set to 1, it indicates that the AMS is currently attempting network reentry from a IEEE802.16e only Legacy BS | |
| Serving BSID | The BSID of the AMS's previous serving ABS before incurring a coverage loss, or the BSID of the serving ABS to which the AMS is currently connected (has completed the registration cycle and is in normal operation). Inclusion of serving BSID in the AAI_RNG-REQ message signals to the target ABS that the AMS is currently connected to the network through the serving ABS and is in the process of HO network reentry. | It shall be included when the AMS is attempting to perform HO reentry. In case of performing Direct HO, this is the BSID of the previous serving Legacy BS. |
| Previous CID | The CID which the AMS used in the previous serving BS | It shall be included when the AMS is attempting to perform Direct HO reentry |
| AK_COUNT | The AMS's current value of the AK_COUNT, which is used to generate the security keys in the target ABS. | It shall be included during reentry, secure Location Update or HO |
| CMAC Tuple | If included, the CMAC Tuple shall be the last attribute in the message. | It shall be included when the AMS is attempting to perform Network Reentry from idle mode, Secure Location Update, or HO, or a reentry after incurring a coverage loss if the AMS has a CMAC tuple necessary to expedite security authentication. |
| LEGACY_CMAC_KEY_COUNT | The AMS's current value of the CMAC_KEY_COUNT, which was used at the previous serving Legacy BS. | It shall be included during Direct HO from a 16e only Legacy BS to the target ABS. |
| Legacy CMAC Tuple | If included, the CMAC Tuple shall be the last attribute in the message. *Note: This is not used to generate the security keys in the target ABS, This is only for security authentication | It shall be included when the AMS is attempting to perform Network Reentry from Direct HO, if the AMS has a CMAC tuple necessary to expedite security authentication. This CMAC is the CMAC tuple used in the previous serving Legacy BS. |

Table 2 below shows examples of parameters of the AAI_RNG-RSP message used for the direct handover using the CMAC.

TABLE 2

| Name | Value | Usage |
|---|---|---|
| Ranging Status | Used to indicate whether UL messages are received within acceptable limits by ABS. 1 = continue, 2 = abort, 3 = success | It shall be included in the AAI_RNG-RSP message |
| Temporary STID | Used for AMS identification until STID is assigned to the AMS during registration procedure. | It shall be included in the AAI_RNG-RSP message in response to the AAI_RNG-REQ message, which is not CMAC protected, when the AMS is not assigned its STID/DID yet. |
| AMSID* | A required parameter when the AMS confirms if the AAI_RNG-RSP is a response to the AAI_RNG-REQ message which the AMS sent. | |

TABLE 2-continued

| Name | Value | Usage |
|---|---|---|
| Legacy Authentication Indicator | Used to indicate whether ABS is able to authenticate the AMS by referring to its CMAC tuple used at the previous serving Legacy only BS. If the indicator is set, it implies that the ABS is able to authenticate the AMS and allows the AMS to perform network reentry at the target ABS. Otherwise, if unset, the AMS shall perform full initial network entry. | |
| Location Update Response | 0x00 = Success of Location Update<br>0x01 = Failure of Location Update<br>0x02 = Reserved<br>0x03 = Success of location update and DL traffic pending<br>0x04 = Allow AMS's DCR mode initiation request or DCR mode extension request<br>0x05 = Reject AMS's DCR mode initiation request or DCR mode extension request<br>0x06~0xFF: Reserved | It shall be included when an ABS sends an AAI_RNG-RSP message in response to an AAI_RNG-REQ message used to perform location update or DCR mode initiation from Idle Mode or DCR mode extension. |
| HO Process Optimization | Identifies reentry process MAC control messages that may be omitted during the current HO attempt due to the availability of MS service and operational context information obtained by means that are beyond the scope of this standard, and the MS service and operational status post-HO completion. The AMS shall not enter normal operation with target ABS until completing receiving all network reentry, MAC control message responses as indicated in HO process optimization. | It shall be included when the AMS is attempting to perform network reentry or HO and the target ABS wishes to identify reentry process MAC control messages that may be omitted during the current HO attempt |

Figure 3:
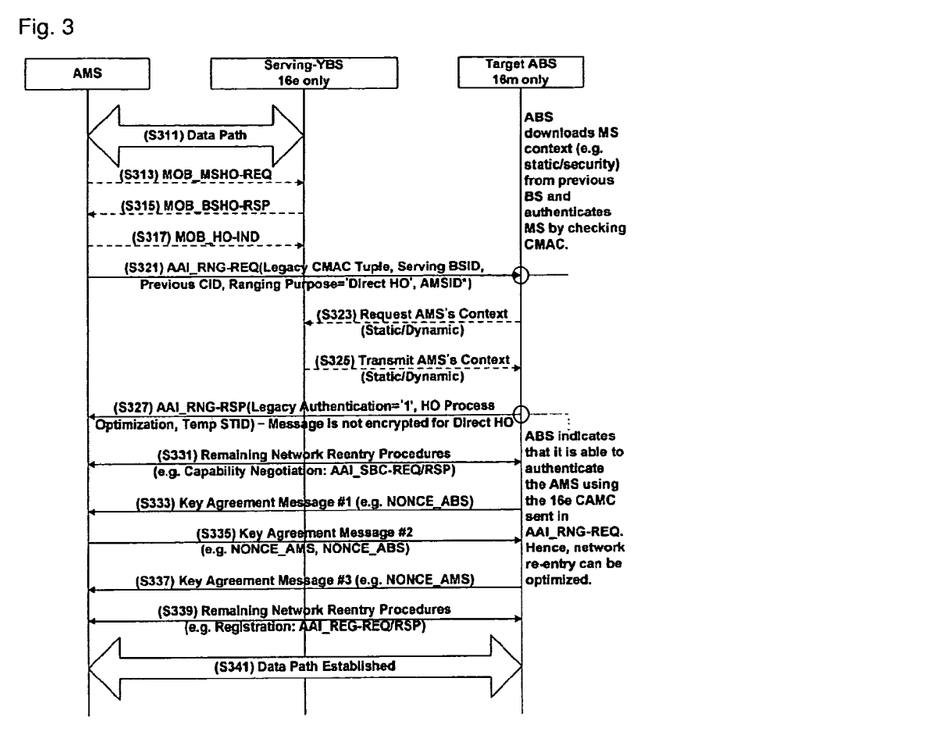
FIG. 3 is a signal flow chart illustrating a case in which a terminal can be authenticated by using IEEE 802.16e CMAC information in a method for performing handover (direct handover using CMAC) according to an exemplary embodiment of the present invention.

FIG. 3 is a signal flow chart illustrating a case in which a terminal can be authenticated by using IEEE 802.16e CMAC information in a method for performing handover (direct handover using the CMAC) according to an exemplary embodiment of the present invention.

As shown in FIG. 3, while the terminal is transmitting and receiving data through a data transmission path established in relation with the serving base station (S311), the terminal may scan a base station supporting only the IEEE 802.16m system among base stations that exist nearby. When the terminal requests handover by transmitting a MOB_MSHO-REQ message to the serving base station (S313), the serving base station transmits a MOB_BSHO-RSP message (S315) to the terminal. Also, the terminal may transmits a MOB_HO-IND including BSID information of the target base station as a parameter to the serving base station to request handover to the target base station from the serving base station (S317). In this case, if the communication system including the serving base station and the target base station is a system in which the process of coordinating handover of the terminal between the serving base station and the target base station is not defined, steps S313 to S317 may be omitted.

Next, the terminal attempts a network re-entry to the target base station. The terminal sends an AAI_RNG-REQ message to the target base station and requests direct handover (S321), and in this case, the terminal includes some information required for performing the direct handover procedure in the AAI_RNG-REQ message and transmits the same.

For example, the terminal may include a parameter (e.g., a bit #8 of a ranging purpose indication is set to 1) designating direct handover, CMAC information (e.g., legacy CMAC tuple) used for a connection with a previous serving base station and a CMAC key value (e.g., LEGACY_CMAC_KEY_COUNT), a BSID of a previous serving base station (e.g., serving BSID), a CID (e.g., a previous CID) used for the connection with the previous serving base station, and the like, in the AAI_RNG-REQ message. The terminal may include terminal identification information (e.g., AMSID*) of the IEEE 02.16m system in the AAI_RNG-REQ message.

Upon receiving the AAI_RNG-REQ message, the target base station uses the information included in the AAI_RNG-REQ message to authenticate the terminal. The target base station requests context (static or dynamic context) of the terminal from the previous serving base station (S323) and receives the context of the terminal from the previous serving base station (S325). The target base station then authenticates the terminal by using the information (in particular, the CMAC information and the CMAC key value) included in the AAI_RNG-REQ message and the context of the terminal received from the previous serving base station.

When the authentication of the terminal is successful, the target base station transmits an AAI_RNG-RSP message to the terminal in response to the AAI_RNG-REQ message which was transmitted by the terminal (S327). The AAI_RNG-RSP message transmitted by the target base station may include a parameter (e.g., HO process optimization) designating a procedure that can be omitted in case of a network re-entry of the terminal, a parameter (e.g., a legacy authentication indicator is set to 1) indicating that the terminal authentication has been successful), a parameter (e.g., a temporary STID) designating a temporary terminal ID used between the terminal and the target base station), and the like. Because a privacy key management (PKM) for security between the terminal and the target base station has not been set up to now, the AAI_RNG-RSP message is not ciphered.

Also, when the target base station has received information such as a flow ID of the terminal or the like from the previous serving base station through a backhaul path, the target base station may include a parameter (e.g., FID_update) designating context mapping of the terminal in the AAI_RNG-RSP, by which the terminal can reduce a burden of performing the process of generating the flow ID from the beginning.

After the target base station transmits the AAI_RNG-RSP message to the terminal, a remaining network re-entry procedure is performed. The terminal and the target base station perform a PKM procedure for a security. The PKM procedure includes a process of agreeing with a key used for authenticating a transmitted or received message or ciphering data (key agreement, steps S333 to S337). The key agreement process may include a procedure of exchanging random numbers (NONCE_ABS, NONCE_AMS) between the terminal and the target base station (S333 to S337).

Or, the terminal and the target base station may negotiate a function the terminal wants to support or use and a function the target base station supports or permits through an AAI_SBC-REQ message and an AAI_SBC-RSP message (capability negotiation, S331). Or, the terminal may perform registration to the target base station through the AAI_REG-REQ message and the AAI_REG-RSP message (registration, S339).

After the network re-entry procedure is completed, the terminal transmits and receives data to and from the target base station through a data transmission path set in the relationship with the target base station (S341).

Figure 4:
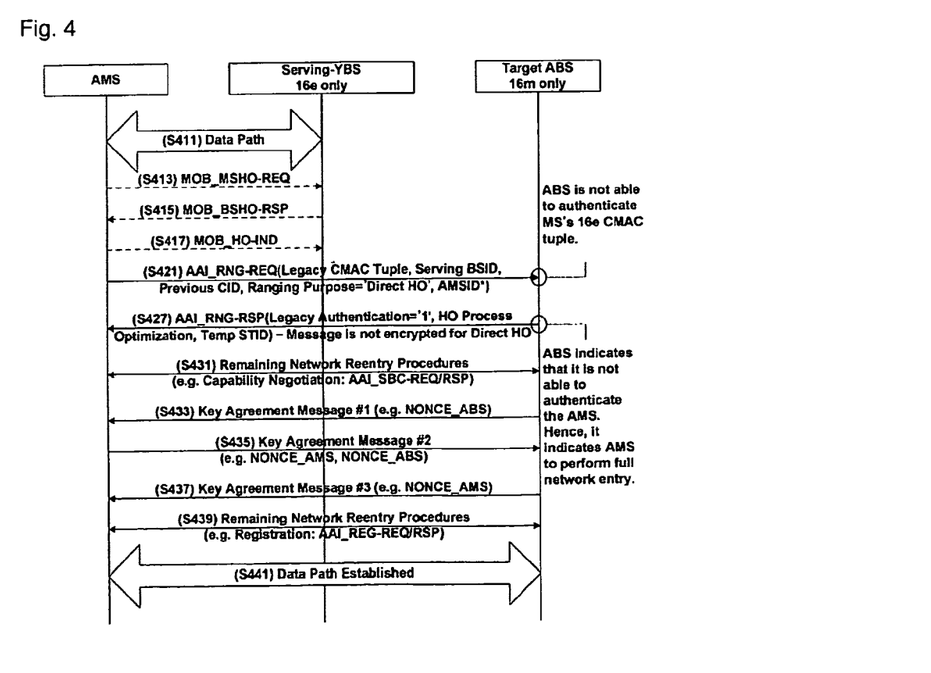
FIG. 4 is a signal flow chart illustrating a case in which a terminal cannot be authenticated by using IEEE 802.16e CMAC information in a method for performing handover (direct handover using CMAC) according to an exemplary embodiment of the present invention.

FIG. 4 is a signal flow chart illustrating a case in which a terminal cannot be authenticated by using IEEE 802.16e CMAC information in a method for performing handover (direct handover using CMAC) according to an exemplary embodiment of the present invention.

A step S411 of transmitting and receiving data, by the terminal, through the data transmission path set in the relationship with the serving base station, a step S413 of requesting, by the terminal, handover by transmitting a MOB_MSHO-REQ message to the serving base station, a step (S415) of transmitting, by the serving base station, a MOB_BSHO-RSP to the terminal, a step S417 of requesting, by the terminal, handover from the serving base station to the target base station, a step S421 of transmitting, by the terminal, an AAI_RNG-REQ message to request direct handover, steps S431 to S439 of performing a remaining network re-entry procedure between the terminal and the target base station, and a step S441 of transmitting and receiving, by the terminal, data through the data transmission path set in the relationship with the target base station can be understood in a similar manner as that described above in steps S311 to S321, and S331 to S341 with reference to FIG. 3 in the case in which the terminal can be authenticated by using the IEEE 802.16e CMAC tuple of the direct handover procedure using the CMAC, so a detailed description thereof will be omitted.

Likewise, the configuration that the parameter (e.g., temporary STID) designating a temporary terminal ID used between the terminal and the target base station is included, the configuration in which the AAI_RNG-RSP message is not ciphered, and the like, in step S427 of transmitting, by the target base station, an AAI_RNG-RSP message to the terminal in response to an AAI_RNG-REQ message the terminal has transmitted can be understood in a similar manner as that described above in step S327 with reference to FIG. 3, so a detailed description thereof will be omitted.

The case in which the terminal can be authenticated in FIG. 3 and the case in which the terminal cannot be authenticated in FIG. 4 can be compared as follows: In the case in which the terminal can be authenticated in FIG. 3, the target base station which has received the AAI_RNG-REQ message can authenticate the terminal by using the information included in the AAI_RNG-REQ, while in the case in which the terminal cannot be authenticated in FIG. 4, the target base station which has received the AAI_RNG-REQ message cannot authenticate the terminal by using the information included in the AAI_RNG-REQ.

Namely, in the case in which the terminal can be authenticated in FIG. 3, the target base station receives the context of the terminal from the previous serving base station, authenticates the terminal, and instructs the terminal to perform an optimized network re-entry procedure, while in the case in which the terminal cannot be authenticated in FIG. 4, the target base station cannot receive or does not receive the context of the terminal from the previous serving base station and instructs the terminal to perform the full network entry procedure.

In order to instruct the network entry procedure, the parameter value (e.g., HO process optimization) which is included in the AAI_RNG-RSP message transmitted by the target base station to the terminal when the terminal can be authenticated in FIG. 3 and designates the procedure that can be omitted in the case of network re-entry of the terminal and the parameter in the case in which it is not possible to authenticate the terminal in FIG. 4 may be different. For example, the HO process optimization in the case in which the terminal can be authenticated in FIG. 3 includes some bits indicating the procedure that can be omitted are set to 1, whereas the HO process optimization in the case in which the terminal cannot be authenticated in FIG. 4 includes the entire bits set to 0.

Or, in order to instruct the network entry procedure, the AAI_RNG-RSP message transmitted by the terminal to the target base station when the target base station can authenticate the terminal may include a parameter (e.g., legacy authentication indicator set to 1) indicating that the terminal authentication has been successful, and the AAI_RNG-RSP message transmitted by the target base station to the terminal when the target base station cannot authenticate the terminal may include a parameter (e.g., legacy authentication indicator is set to 0) indicating that terminal authentication has failed.

Figure 5:
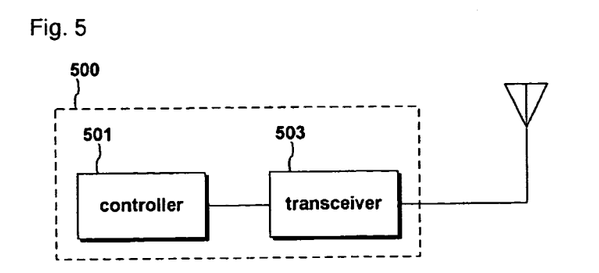
FIG. 5 is a schematic block diagram of a handover performing apparatus according to an exemplary embodiment of the present invention.

FIG. 5 is a schematic block diagram of a handover performing apparatus according to an exemplary embodiment of the present invention.

A handover performing apparatus 500 according to an exemplary embodiment of the present invention includes a controller 501 and a transceiver 503. The handover performing apparatus 500 according to an exemplary embodiment of the present invention may be a terminal or a base station. In the following description, it is assumed that the handover performing apparatus 500 according to an exemplary embodiment of the present invention is a terminal.

The controller 501 transmits a control signal for controlling a general operation of the transceiver 503.

The controller 501 acquires information regarding target base stations through scanning, selects a target base station, and performs a network entry procedure to the target base station according to a handover procedure optimization flag.

The transceiver 503 transmits a ranging request message including authentication information which has been used for a connection with a serving base station and indication information indicating direct handover to the target base station, to the target base station, and receives a ranging response message including the handover procedure optimization flag from the target base station.

In the following description, it is assumed that handover performing apparatus 500 according to an exemplary embodiment of the present invention is a base station (i.e., a target base station).

The controller 501 transmits a control signal for controlling a general operation of the transceiver 503.

The controller 501 determines a handover procedure optimization flag according to the result obtained by authenticating a terminal according to authentication information and performs a network entry procedure to the target base station of the terminal according to the handover procedure optimization flag.

The transceiver 503 receives a ranging request message including the authentication information used for the connection between the terminal and the serving base station and the indication information indicating direct handover to the target base station from the terminal and transmits a ranging response message including the handover procedure optimization flag to the terminal.

The controller 501 and the transceiver 503 when the handover performing apparatus 500 according to an exemplary embodiment of the present invention is the terminal or the base station can be understood in a similar manner as those described above with reference to FIGS. 1 to 4 in explaining the handover performing method according to an exemplary embodiment of the present invention, so its detailed description will be omitted.

The handover performing apparatus according to an exemplary embodiment of the present invention may include hardware, software, a recording medium, for example, an output device (display device, speaker, etc.), an input device (touch screen, keypad, microphone, etc.), a memory, and a processor, required for implementing the technical idea of the present invention, besides the foregoing elements. The constituents are obvious to the skilled person in the art, so its detailed description will be omitted.

The handover performing apparatus according to an exemplary embodiment of the present invention may be implemented by hardware, software, a computer-readable recording medium, and some combination thereof. For a hardware implementation, the handover performing apparatus according to an exemplary embodiment of the present invention may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof.

For a software implementation, the handover performing apparatus according to an exemplary embodiment may be implemented as at least one module performing the respective functions or respective operations as described above. The module may be implemented by a software code created in a proper program language, and the software code may be stored in a memory and executed by a processor. The memory or the processor may be various units well known to the skilled person in the art.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

The invention claimed is:

1. A method for performing handover by a terminal, the method comprising:
   acquiring information related to a target base station (BS) through scanning;
   transmitting a ranging request message to the target BS, the ranging request message including authentication information used for a connection with a serving BS and indication information indicating direct handover to the target BS;
   receiving a ranging response message including a handover procedure optimization flag from the target BS; and
   performing a network entry procedure according to the handover procedure optimization flag in order to communicate with the target BS.

2. The method of claim 1, wherein the network entry procedure comprises:
   a full network entry procedure when the target BS cannot authenticate the terminal based on the authentication information; and
   a network re-entry procedure when the target BS can authenticate the terminal based on the authentication information.

3. The method of claim 1, wherein the authentication information is a cipher-based message authentication code (CMAC) tuple.

4. The method of claim 1, wherein the handover procedure optimization flag is set based on a result of the target BS authenticating the terminal based on the authentication information.

5. The method of claim 1, wherein the handover procedure optimization flag is set based on a result of the target BS authenticating the terminal based on the authentication information and a security context of the terminal provided by the serving BS to the target BS.

6. The method of claim 1, wherein the handover procedure optimization flag comprises information identifying a medium access control (MAC) control message that can be omitted in the handover procedure.

7. The method of claim 1, wherein performing the network entry procedure comprises performing at least:
   an agreement on a key used for authenticating a message transmitted to or received from the target BS or used for ciphering data;
   a capability negotiation for negotiating a function that the terminal wants to support or use and a function that the target BS supports or permits; or
   a registration to a network of the target BS.

8. The method of claim 1, wherein the ranging response message comprises a temporary subscriber terminal identifier (TSTID) used before registration to a network of the target BS.

9. The method of claim 1, further comprising:
   transmitting a handover request message to the serving BS before selecting the target BS;
   receiving a handover response message from the serving BS; and
   transmitting a message to the serving BS, the message instructing handover to the target BS.

10. A method for performing handover by a target base station (BS), the method comprising:
    receiving a ranging request message from a terminal, the ranging request message including authentication information used for a connection between the terminal and a serving BS and indication information indicating direct handover to the target BS;
    determining a handover procedure optimization flag according to a result of authenticating the terminal based on the authentication information;
    transmitting a ranging response message to the terminal, the ranging response message including the handover procedure optimization flag; and performing a network entry procedure according to the handover procedure optimization flag in order to communicate with the terminal.

11. The method of claim 10, wherein performing the network entry procedure comprises:
- a full network entry procedure when the terminal cannot be authenticated based on the authentication information; and
- a network re-entry procedure when the terminal can be authenticated based on the authentication information.

12. The method of claim 10, wherein the handover procedure optimization flag is determined based on a result of authenticating the terminal based on the authentication information and a security context of the terminal provided by the serving BS.

13. A terminal performing handover, the terminal comprising:
- a controller for acquiring target base station (BS) information through scanning, selecting a target BS and performing a network entry procedure according to a handover procedure optimization flag in order to communicate with the selected target BS; and
- a transceiver for transmitting a ranging request message to the selected target BS, the ranging request message including authentication information used for a connection with a serving BS and indication information indicating direct handover to the selected target BS, and for receiving a ranging response message including the handover procedure optimization flag from the selected target BS.

14. A target base station (BS) performing handover, the target BS comprising:
- a controller for determining a handover procedure optimization flag according to a result of authenticating a terminal based on authentication information and for performing a network entry procedure according to the handover procedure optimization flag in order to communicate with the terminal; and
- a transceiver for receiving a ranging request message from the terminal, the ranging request message including authentication information used for a connection between the terminal and a serving BS and indication information indicating direct handover to the target BS, and for transmitting a ranging response message to the terminal, the ranging response message including the handover procedure optimization flag.

* * * * *